(12) United States Patent
Malik et al.

(10) Patent No.: US 9,395,904 B2
(45) Date of Patent: Jul. 19, 2016

(54) PROVIDING GAME AND FACILITY INFORMATION TO IN-STADIUM SPECTATORS

(71) Applicant: Stadium Technology Company, Santa Clara, CA (US)

(72) Inventors: Kunaldeep Malik, Palo Alto, CA (US); Gideon Yu, Hillsborough, CA (US); Paraag Marathe, Menlo Park, CA (US); Patrick Weiss, San Francisco, CA (US); Jonathan Dubin, San Francisco, CA (US)

(73) Assignee: VenueNext, Inc., Palo Alto, CA (US)

( * ) Notice: Subject to any disclaimer, the term of this patent is extended or adjusted under 35 U.S.C. 154(b) by 22 days.

(21) Appl. No.: 14/012,490

(22) Filed: Aug. 28, 2013

(65) Prior Publication Data

US 2015/0058781 A1  Feb. 26, 2015

Related U.S. Application Data

(60) Provisional application No. 61/870,173, filed on Aug. 26, 2013.

(51) Int. Cl.

| | |
|---|---|
| *G06F 3/01* | (2006.01) |
| *G06F 3/0488* | (2013.01) |
| *H04N 21/4722* | (2011.01) |
| *H04N 21/2187* | (2011.01) |
| *H04N 21/414* | (2011.01) |
| *H04N 21/431* | (2011.01) |
| *H04N 21/81* | (2011.01) |
| *G06F 3/00* | (2006.01) |

(52) U.S. Cl.
CPC .......... *G06F 3/0488* (2013.01); *H04N 21/2187* (2013.01); *H04N 21/41407* (2013.01); *H04N 21/4312* (2013.01); *H04N 21/4722* (2013.01); *H04N 21/8133* (2013.01)

(58) Field of Classification Search
USPC ................................ 715/772, 718; 725/13, 62
See application file for complete search history.

(56) References Cited

U.S. PATENT DOCUMENTS

| | | | | |
|---|---|---|---|---|
| 5,217,229 | A * | 6/1993 | Jaime | 273/247 |
| 5,574,845 | A * | 11/1996 | Benson et al. | 345/418 |
| 5,755,441 | A * | 5/1998 | Langan et al. | 273/247 |
| 6,049,333 | A * | 4/2000 | LaJoie et al. | 715/718 |
| 6,899,331 | B1 * | 5/2005 | Beyazbayrak | 273/239 |
| 7,596,759 | B2 * | 9/2009 | Verna | 715/772 |
| 8,196,928 | B2 * | 6/2012 | Thomopoulos | 273/247 |
| 8,451,265 | B2 * | 5/2013 | Gloudemans et al. | 345/419 |
| 2002/0040253 | A1 * | 4/2002 | McNally et al. | 700/91 |
| 2005/0104283 | A1 * | 5/2005 | Hodgeman | 273/108 |
| 2006/0055115 | A1 * | 3/2006 | Schaub, Jr. | 273/317.5 |
| 2006/0214371 | A1 * | 9/2006 | Laporte | 273/247 |
| 2007/0064811 | A1 * | 3/2007 | Zador et al. | 375/240.26 |
| 2007/0287431 | A1 * | 12/2007 | Verna | 455/414.1 |
| 2009/0091583 | A1 * | 4/2009 | McCoy | 345/633 |
| 2010/0160012 | A1 * | 6/2010 | Amaitis et al. | 463/2 |
| 2011/0148036 | A1 * | 6/2011 | Nolen | 273/127 R |
| 2011/0212683 | A1 * | 9/2011 | Ortiz | 455/3.06 |
| 2011/0246889 | A1 * | 10/2011 | Moore | 715/719 |
| 2012/0189273 | A1 * | 7/2012 | Folgner et al. | 386/241 |

(Continued)

*Primary Examiner* — Toan Vu
(74) *Attorney, Agent, or Firm* — Hickman Palermo Becker Bingham LLP

(57) ABSTRACT

Techniques for providing play-by-play game information and stadium facility load information to in-stadium spectator devices and for using the provided information at the spectator devices.

15 Claims, 12 Drawing Sheets

(56) References Cited

U.S. PATENT DOCUMENTS

| | | | |
|---|---|---|---|
| 2013/0076908 A1* | 3/2013 | Bratton et al. | 348/159 |
| 2013/0191752 A1* | 7/2013 | Lapierre et al. | 715/723 |
| 2013/0227596 A1* | 8/2013 | Pettis et al. | 725/13 |
| 2013/0276035 A1* | 10/2013 | Walker et al. | 725/62 |
| 2013/0326374 A1* | 12/2013 | Harvey et al. | 715/756 |
| 2014/0213357 A1* | 7/2014 | Claffey | 463/31 |
| 2014/0282745 A1* | 9/2014 | Chipman et al. | 725/61 |
| 2014/0337763 A1* | 11/2014 | Feldstein et al. | 715/753 |

\* cited by examiner

```
<play playId="856" teamId="1800" possessionTeamId="1800" penalty="false" scoring="false"
endQuarter="false" goalToGo="false" time="01:38" timeOfDay="01:59:26" quarter="1" down="2"
yardsToGo="10" yardline="GB 33">
   <playDescription>(1:38) 26-D.Harris right end to GB 38 for 5 yards (52-P.Willis,
91-R.McDonald).</playDescription>
  </play>
```

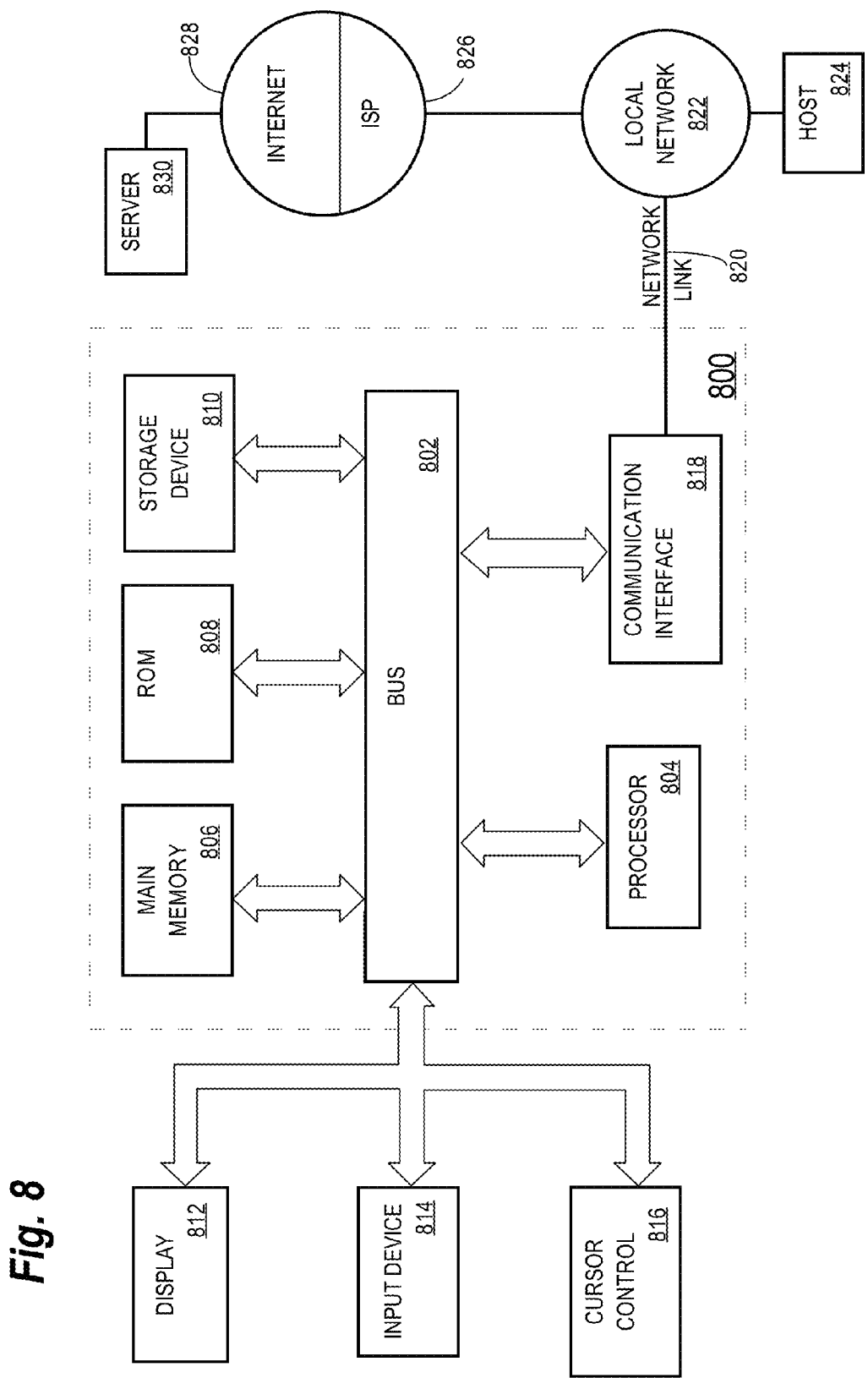

PROVIDING GAME AND FACILITY INFORMATION TO IN-STADIUM SPECTATORS

PRIORITY CLAIM

This application claims the benefit of Provisional Appln. 61/870,173, filed Aug. 26, 2013, the entire contents of which is hereby incorporated by reference as if fully set forth herein, under 35 U.S.C. §119(e).

TECHNICAL FIELD

The present disclosure relates to providing information related to a live sporting event to personal computing devices used by in-stadium spectators of the live sporting event.

BACKGROUND

Live spectator sporting events have been a significant source of entertainment for much of modern human civilization. Most live sporting events take place at a venue, arena, field, or stadium that provides seating or other designated area from which spectators can view the live sporting event. As an in-stadium spectator, a person can fulfill vicariously a desire for athletic achievement, project a public image of team allegiance, and find connection to others with shared allegiance. Today, many organizations, schools, universities, sports leagues, teams, and stadium operators derive significant revenue from persons willing to pay money to be an in-stadium spectator of a live sporting event and from associated in-stadium concessions and on-site merchandise sales.

At the same time, the increasing quality and availability of television and Internet broadcasting of sporting events, coupled with the wide-availability of in-home high-definition television sets and broadband Internet connectivity, has made it possible to view sporting events live from within the home with a quality viewing experience. In some cases, viewers may prefer the in-home experience to the in-stadium experience because of enhanced experiences that may be available in the home but not in the stadium.

For example, a viewer at home using a digital video recording (DVR) device may be able to replay a play during the sporting event multiple times and then subsequently catch up with live action of the sporting event as broadcast to the viewer's DVR device. Typically, an in-stadium spectator can consume replays only from an in-stadium Jumbotron or other in-stadium television that the spectator has no control over. If the spectator has a mobile computing device such as a smart phone, the spectator may attempt to connect to the Internet via a local wireless or cellular network in order to download and view a replay at the mobile device.

As another example, a viewer at home may access Internet web sites that provide supplemental material to accompany viewing the sporting event on television. Such supplemental material may include game statistics and Internet chat room comments, for example.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

BRIEF DESCRIPTION OF THE DRAWINGS

In the drawings:

FIG. 8 is a block diagram illustrating a computer system on which embodiments of the invention may be implemented.

DETAILED DESCRIPTION

A system and method for providing information to in-stadium spectators in conjunction with a live sporting event are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In-Stadium Architecture

Figure 1:
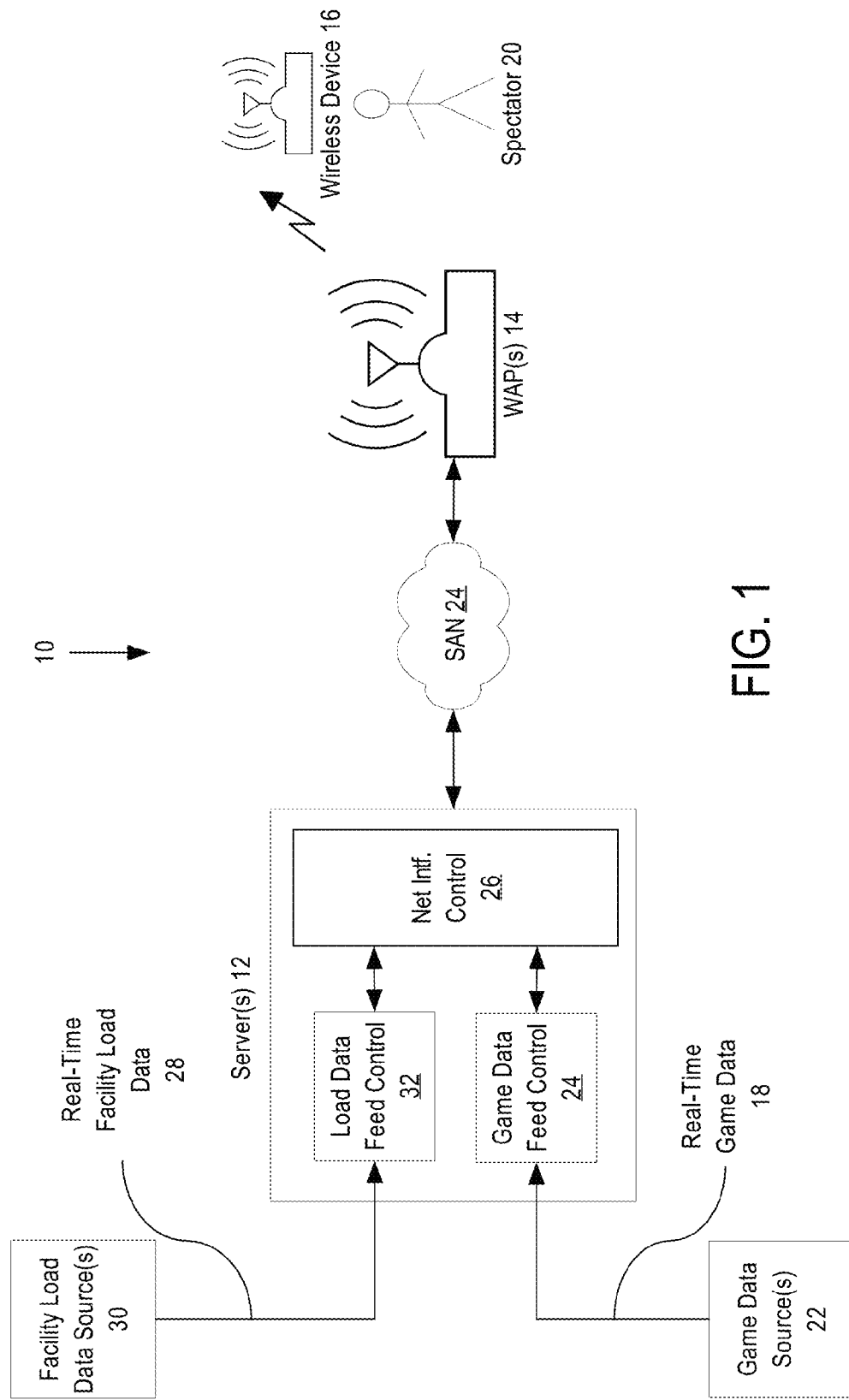
FIG. 1 is a block diagram illustrating a possible in-stadium system architecture.

FIG. 1 illustrates a possible system architecture in accordance with an embodiment of the present invention. System 10 typically will be used at a live sporting event where there is a gathering of a large number of people (for example, hundreds or more), attending a performance of a game. Examples of live sporting events include but are not limited to: a football game, a soccer game, a basketball game, a baseball game, or a hockey game.

Typically, a live sporting event takes place in a venue, arena, field, stadium, or other physical facility or location suitable for performing the game and providing a designated area or areas from which spectators can view the performance. For clarity, system 10 can be used at a wide variety of facilities and locations without departing from the spirit of the invention. Accordingly, while example implementations provided herein are made in connection with a stadium, this should not be considered a limiting feature.

A live sporting event typically includes a series of plays. A play may be a series of movements by at least one player, frequently in concert with a team of players, to score points, achieve a goal, or advance the position of a team, ball, puck, or other object(s). Examples include plays in the game of American football. Frequently, another player, or team of players, acts in opposition to prevent advancement.

System 10 may be used to provide real-time game data and/or real-time stadium facility load data to the wireless mobile computing devices of in-stadium spectators. The real-time game data conveys information relating to plays the spectators view. For example, real-time game data in the context of American football can be ball possession information, yardage gained/loss information, ball position information, information about players in the game, player injury information, among many others. The real-time game data is typically supplied by an authority managing the live sporting event. The real-time stadium facility load data pertains to current load and/or wait times at various in-stadium facilities. Such in-stadium facilities may include, for example, restrooms, food and beverage concession stands, and merchandise stands.

As shown in FIG. 1, system 10 includes one or more servers 12, a wireless access point 14, and a wireless mobile computing device 16 used by a spectator 20. While only one wireless access point 14 is shown in FIG. 1, it should be understood that system 10 may include multiple wireless access points 14 spread and distributed throughout the stadium. Similarly, while only one mobile device 16 is shown in FIG. 1, it should be understood that system 10 may include multiple mobile devices 16, each device 16 used by a single spectator 20.

In most practical applications, the number of servers 12 and the number and location of wireless access points 14 deployed in the stadium will depend on the number of spectators 20 expected to concurrently use their mobile devices 16 for receiving real-time game data and/or real-time stadium facility load data. For example, for a professional American football game that may attract tens of thousands of spectators, system 10 may include a number of servers 12 and wireless access points 14 spread and distributed throughout the stadium to support an equal number of mobile devices 16.

Wireless access point 14 and mobile device 16 communicate with each other wirelessly. In some embodiments, such wireless communication occurs using an Institute of Electrical and Electronics Engineers (IEEE) 802.11-based wireless local area networking (WLAN) protocol. Examples of suitable WLAN protocols include but are not limited to: 802.11a, 802.11b, 802.11g, 802.11n, and 802.11ac. However, radio frequency (RF) technologies and protocols other than IEEE 802.11-based technologies and protocols may be used and the present invention is not limited to 802.11-based technologies and protocols. In some embodiments, wireless access points 14 deployed in the stadium in proximity to each other operate on different wireless channels to prevent RF interference.

Wireless access point 14 connects to servers 12 via an in-stadium wired data network (designated as stadium area network (SAN) 24 in FIG. 1). SAN 24 may be based on any number of a wide variety of different wired networking technologies including but not limited to wired Ethernet (for example, IEEE 802.3), coaxial cable, and/or optical fiber. SAN 24 may include a number of Layer 3 networking switches such as, for example, internet protocol television (IPTV) switches, wireless switches, and point-of-sale (POS) switches aggregated by a networking fabric. SAN 24 may also be connected to the Internet (not shown) to provide Internet connectivity to mobile devices 16 or other networking devices connected to SAN 24.

In some embodiments, wireless communication between wireless access point 14 and mobile device 16 occurs in-stadium. "In-stadium" in the wireless communication context means that the wireless RF transmissions originate from a RF antenna either on the premises of the stadium or adjacent the stadium (for example, within a kilometer of a wireless access point affixed to the stadium structure). For example, an in-stadium wireless communication may involve spectator 20 using mobile device 16 to receive real-time game data and/or real-time facility load data from wireless access point 14 affixed to a stadium structure (for example, a seat, pillar, or overhang) when spectator 20 is at his or her seat, waiting in a concession, merchandising, or restroom line, or tailgating in the stadium parking lot.

Real-Time Game Data

Servers 12 receive real-time game data 18 from various game data sources 22. Real-time game data 18 may be formatted or edited before receipt by servers 12. Game data sources 22 may be numerous and vary depending on the type of live sporting event. For example, for a professional American football game, game data sources 22 may include a human user or users that input play-by-play information into a computer as plays of the game occur. Thus, real-time game data 18 received by servers 12 may reflect the most recent play of the game that has occurred. Real-time game data 18 reflecting the most recent play may be received at servers 12 very soon after the play has completed (for example, within milliseconds or seconds). Other game data sources 22 are possible such as scoreboard systems and game clocks or timers that provide score or game time related information.

In some embodiments, some game data sources 22 are in-stadium. "In-stadium" in the game data source 22 context means that real-time game data 18 is created on the premises of stadium or adjacent to the stadium (for example, in a news or media operations truck or other mobile operations center parked adjacent to the stadium). For example, a human user entering play-by-play information may be doing so from a laptop computer in a stadium booth where the user can view plays live and enter real-time game data into the laptop as plays occur.

In some embodiments, real-time game data 18 is supplied by an authority managing the live sporting event (or a contractor or affiliate thereof). For example, in the case of professional American football, the real-time game data 18 (or portions thereof) may include GAME STATISTICS & INFORMATION SYSTEM (GSIS) data supplied by the NATION FOOTBALL LEAGUE (NFL).

In some embodiments, real-time game data 18 conveys information relating to plays spectators 20 can see. For example, real-time game data 18 in the context of American football can be ball possession information, yardage gained/loss information, ball position information, information about players in the game, player injury information, among many others.

In the embodiment shown in FIG. 1, server(s) 12 receive real-time game data 18. In one non-limiting example, real-time game data 18 includes information relating to the live sporting event such as, for example, play-by-play information, among others. In the specific example of a profession American football, real-time game data 18 can include, among other information: scoring summary information, play-by-play information, passing statistics, rushing statistics, penalty statistics, punting statistics, field goal statistics, extra point statistics, touchdown statistics, fumble statistics, offensive statistics, defensive statistics, interception statistics, punt return statistics, kick return statistics, big/critical/pivotal play information, or news headline or TWITTER reaction information relating to big/critical/pivotal plays.

Servers 12 organize real-time game data 18 fed from various game data sources 22 into a structured data feed sent to individual mobile devices 16. Servers 12 are configured with game data feed control 24 coupled to network interface control 26, both of which may be implemented in software or a combination of software and hardware. Servers 12 may provide a computing platform on which game data feed control 24 and network interface control 26 execute. Accordingly, servers 12 may include processors and memory to store computer program code and data. Servers 12 in FIG. 1 may represent computers, one or more computer programs or other software elements, or a combination thereof such as a special-purpose computer with logic or other functional units configured to perform the processes described herein, or a general-purpose computer that stores and executes program logic configured to perform the processes described herein.

Game data feed control 24 receives real-time game data 18 from the various game data sources 22 and aggregates real-time game data 18 into a stream or streams of messages sent by network interface controller 26 to mobile devices 16. The messages may be broadcast from servers 12 to mobile devices 16. For example, real-time game data 18 may be broadcast to multiple mobile devices 16 using a suitable networking protocol for broadcasting such as, for example, the user datagram protocol (UDP). Alternatively, servers 12 may send messages to mobile devices 16 in individual message streams. For example, real-time game data 18 may be unicast to a mobile device 16 using a suitable connection-oriented networking protocol such as, for example, the Transmission Control Protocol/Internet Protocol (TCP/IP). Messages sent to mobile devices 16 may be structured according to particular data interchange format such as, for example, the eXtensible Markup Language (XML), a protocol buffer, or in Javascript object notation (JSON). Messages may also be compressed for network bandwidth efficiency.

Real-Time Facility Load Data

In some embodiments, servers 12 also receive real-time facility load data 28 from various facility load data sources 30. Real-time facility load data 28 represents current load at various physical spectator facilities located throughout the stadium. Such facilities may include, but are not limited to, restrooms, concession stands, and merchandise stands. More generally, such facilities may include any in-stadium facilities where spectators congregate or queue.

In some embodiments, real-time facility load data 28 includes spectator location information for various locations within the stadium. Physical stadium surface area is divided in cells. For example, each cell may correspond to a 30 foot by 30 foot square surface area of a stadium floor or level. Cells may be assigned to different stadium levels if the stadium has multiple levels. Real-time facility load data 28 includes occupant density values for cells. An occupant density value for a cell represents a number of persons currently located within the stadium surface area of the cell. Such occupant density value may be determined based on global positioning system (GPS) information and/or Wi-Fi positioning information provided by powered-on handheld devices in the physical possession of occupants within the stadium surface area of the cell.

Servers 12 organize real-time facility load data 28 fed from various facility load data sources 30 for serving to spectator devices 16 upon request. For this, servers 12 include load data feed control 32 which is coupled to network interface control 26.

In some embodiments, load data feed control 32 organizes real-time facility load data 28 into data representing a graphical representation of facility load. The graphical representation may be a stadium level map showing various stadium facilities such as restrooms, concession stands, and merchandise stands with graphical load indicators presented on the map. The graphical load indicators may heat map density surfaces, for example, indicating person density near various stadium facilities. The graphical representation or data for generating the graphical representation may be served by network interface control 26 to spectator devices 16 upon request.

In some embodiments, load data feed control 32 computes estimated wait times for various in-stadium facilities based on received real-time facility load data 28. For example, based on the number of persons currently physically near a concession stand as indicated by received real-time facility load data 28, load data feed control 32 can compute an estimate of the number of minutes a person would be expected to have to stand in line at the concession stand before being able to place their order or receive ordered items. Such estimates may be served by network interface control 26 to spectator devices 16 upon request.

Example Spectator Device

Figure 2:
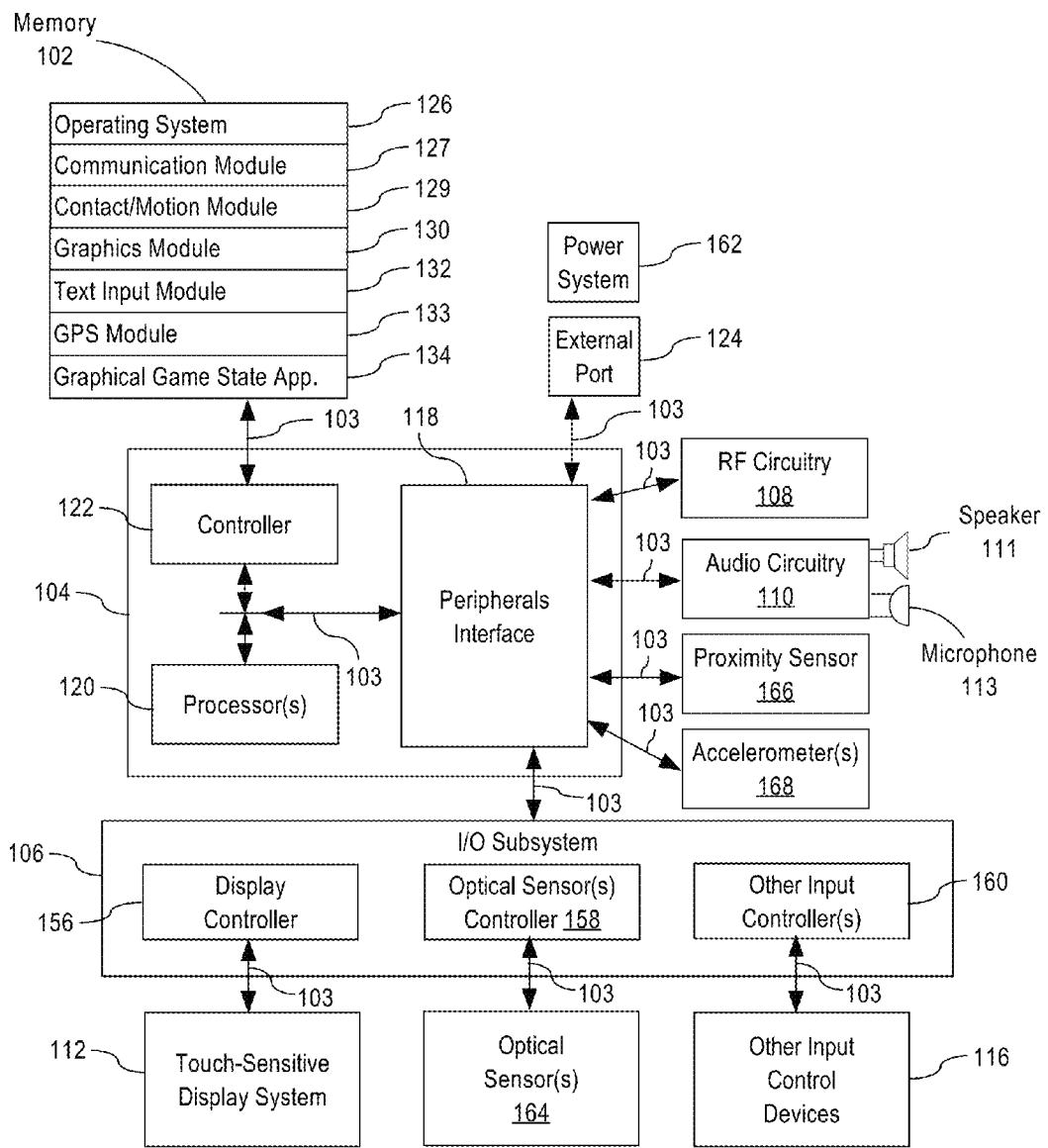
FIG. 2 is a block diagram of a mobile computing device for displaying information pertaining to a live sporting event to an in-stadium spectator.

Mobile spectator devices 16 may receive real-time game data 18 and/or real-time facility load data 28 and/or data produced therefrom by load data feed control 30 and/or game data feed control 24 from network interface control 26 of servers 12. Devices 16 may be configured with a mobile application for displaying data received from servers 12. FIG. 2 is a block diagram of an example of mobile device 16 suitable for displaying such data. In various embodiments, mobile device 16 may comprise a smartphone, tablet computer, netbook computer, ultrabook computer, laptop computer, or other mobile or portable computing device.

Example device 16 includes memory 102. Memory 102 may include high-speed random access memory and may also include non-volatile memory, such as one or more magnetic disk storage devices, flash memory devices, or other non-volatile solid-state memory devices. Access to memory 102 by other components of device 16, such as CPU 120 and peripherals interface 118, may be controlled by memory controller 122. Peripherals interface 118 couples the input and output peripherals of example device 16 to the CPU 120 and memory 102. One or more processors 120 run or execute various software programs and/or sets of instructions stored in memory 102 to perform various functions for example device 16 and to process data. In some embodiments, peripherals interface 118, CPU 120, and memory controller 122 may be implemented on a single chip, such as chip 104. In some other embodiments, they may be implemented on separate chips.

The RF (radio frequency) circuitry 108 receives and sends RF signals, also called electromagnetic signals. Audio circuitry 110, speaker 111, and microphone 113 provide an audio interface between a user and example device 16. I/O subsystem 106 couples input/output peripherals on example device 16, such as touch screen 112 and other input/control devices 116, to peripherals interface 118. I/O subsystem 106 may include display controller 156 and one or more input controllers 160 for other input or control devices.

Touch-sensitive touch screen 112 provides an input interface and an output interface between the device and a user. Touch screen 112 has a touch-sensitive surface, sensor or set of sensors that accepts input from the user based on haptic and/or tactile contact. In an example embodiment, a point of contact between touch screen 112 and the user corresponds to a finger of the user.

Example device 16 also includes power system 162 for powering the various components. Power system 162 may include a power management system, one or more power sources (for example, battery, alternating current (AC)), a recharging system, a power failure detection circuit, a power converter or inverter, a power status indicator (for example, a light-emitting diode (LED)) and any other components associated with the generation, management and distribution of power in portable devices.

Example device 16 may also include one or more optical sensors 164. Optical sensor 164 may include charge-coupled device (CCD) or complementary metal-oxide semiconductor (CMOS) phototransistors.

Figure 3:
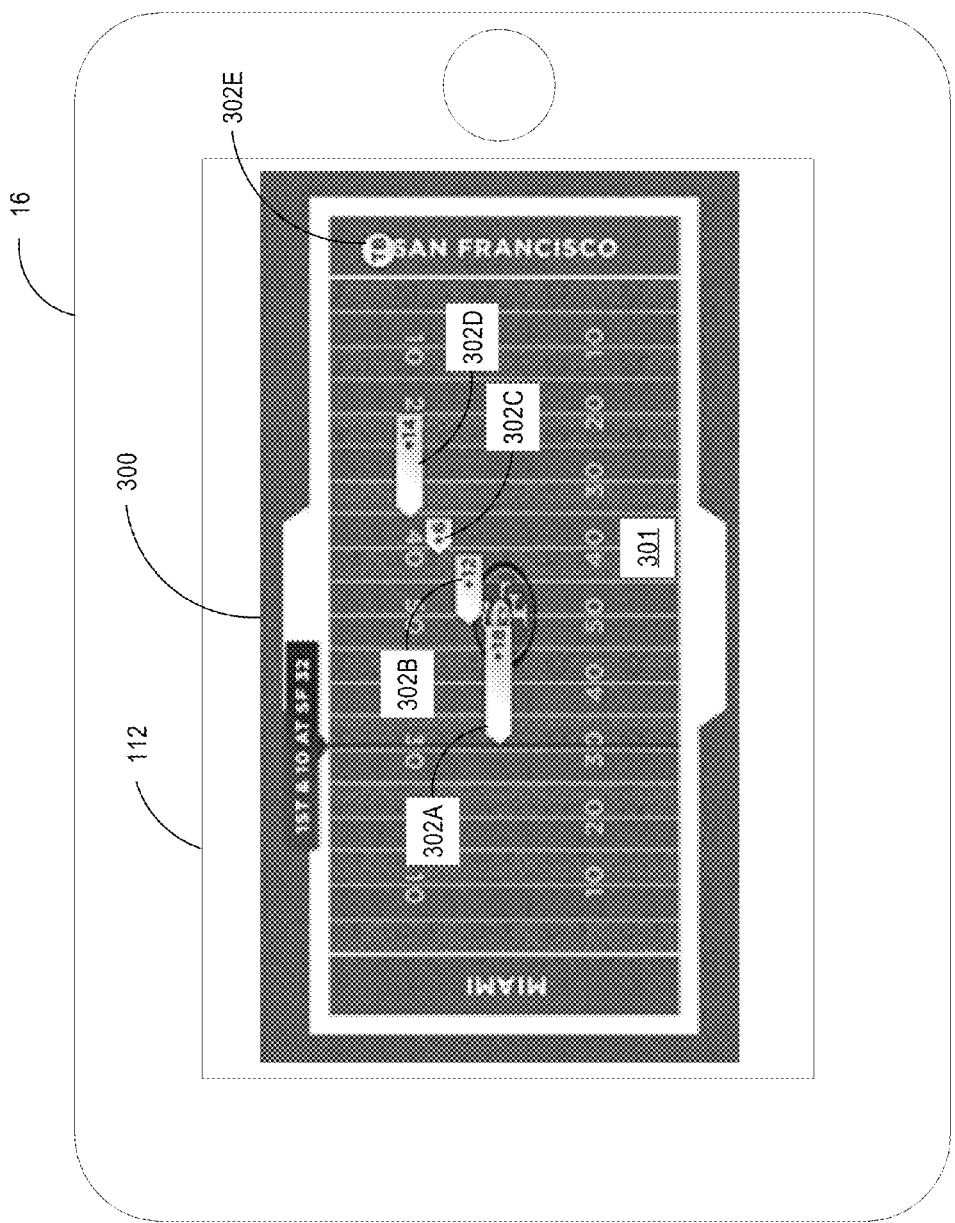
FIG. 3 illustrates an external view of a mobile computing device with a touch-sensitive display screen displaying game state information.

Example device 16 may also include one or more proximity sensors 166. FIG. 3 shows proximity sensor 166 coupled to peripherals interface 118. Alternately, proximity sensor 166 may be coupled to input controller 160 in I/O subsystem 106.

Example device 100 may also include one or more accelerometers 168. FIG. 3 shows accelerometer 168 coupled to peripherals interface 118. Alternately, accelerometer 168 may be coupled to input controller 160 in I/O subsystem 106.

In some embodiments, the software components stored in memory 102 may include operating system 126, communication module (or set of instructions) 127, contact/motion module (or set of instructions) 129, graphics module (or set of instructions) 130, text input module (or set of instructions) 132, Global Positioning System (GPS) module (or set of instructions) 133, and graphical game state mobile application 134.

Operating system 126 (for example, IOS, ANDROID, LINUX, UNIX, OS X, or WINDOWS MOBILE) includes various software components and/or drivers for controlling and managing general system tasks (for example, memory management, storage device control, or power management) and facilitates communication between various hardware and software components.

Communication module 127 facilitates communication with other devices over one or more external ports 124 and also includes various software components for handling data received by the RF circuitry 108 and/or the external port 124. External port 124 (for example, Universal Serial Bus (USB), or FIREWIRE) is adapted for coupling directly to other devices or indirectly over a network (for example, the Internet, wireless LAN, or wide area network).

Contact/motion module 129 may detect contact with touch screen 112 (in conjunction with display controller 156).

Graphics module 130 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user interface objects including soft keys), digital images, videos, animations and the like.

Text input module 132, which may be a component of graphics module 130, provides soft keyboards for entering text in various software applications stored in memory 102.

GPS module 133 determines the location of the device and provides this information for use in various software applications stored in memory 102 (for example, to graphical game state application 134).

Graphical game state application 134 presents, among other things, a graphical representation of the live sporting event on touch screen display 112.

In some embodiments, graphical game state application 134 generates the graphical representation based on real-time game data 18 and/or data produced therefrom received from servers 12.

In some embodiments, graphical game state application 134 also presents current stadium facility load information on touch screen display 112. Such presentation may be in various forms including, for example, a stadium map with heat-map surfaces or other density surfaces overlaid thereon showing person density near stadium facilities. As another example, such presentation may be a list of stadium facilities (e.g., concession stands) with associated estimated wait times. Such presentation may be based on real-time facility load data 28 and/or data produced therefrom received from servers 12.

Graphical Representation of Game State

FIG. 3 is a block diagram illustrating an external view of example device 16 of FIG. 2. Example device 16 includes touch screen display 112 on which graphical representation 300 of the live sporting event is displayed. In this example, the live sporting event is professional American football. However, a graphical representation of other live sporting events may be displayed in other embodiments. For example, the graphical representation may be of a soccer game, a basketball game, a baseball game, or a hockey game.

Graphical representation 300 includes a representation 401 of the playing area. In this example, playing area representation 301 is of a professional American football field showing the end zones, field boundaries, and yardage markings. A different playing area representation 401 may be displayed for other live sporting events. For example, the playing area representation may be of a soccer field, a basketball court, a baseball field, or a hockey rink.

Graphical representation 300 also includes recent play indicators 302. In this example, the five most recent plays are shown with recent play indicators 302A-302E, each indicator 302 indicating the yardage gained (or lost) by the team currently in possession of the football. In particular, most recent play 302A is a gain of 18 yards, second most recent play 302B is a gain of twelve yards, third most recent play 302C is a gain of six years, fourth most recent play 302D is a gain of fourteen yards, and fifth most recent play 302E is a touchback.

In the current example, each recent play indicator 302 indicates a number of aspects of the corresponding play.

In one aspect, the location of a recent play indicator 302 on the playing area representation 301 indicates the location of the play relative to the actual playing area. For example, recent play indicator 302D indicates that the corresponding play started at the twenty yard line and that the football was advanced to the thirty-four yard line.

In another aspect, each recent play indicator 302 indicates the amount of the playing field covered by the corresponding play. For example, recent play indicator 302C indicates that the corresponding play covered six yards.

Recent play indicators can indicate other play information. For example, recent play indicators may indicate player information (for example, player name(s) and/or player number(s) involved in the play); timing information (for example, game time occurrence of the play and/or play time length), or type of play (e.g., scoring play, big play, play in which an injury occurred).

Recent play indicators can indicate different play aspects for different types of live sporting events. For example, recent play indicators for a soccer game, basketball, game, or hockey game may indicate that a shot attempt was made, where on the playing field the shot was taken, which player took the shot, and the result of the shot attempt.

Example Real-Time Game Data

Graphical game state application 134 may generate or update recent play indicators 302 on display 112 of mobile device 16 in response to receiving real-time game data 18 and/or data produced therefrom for recently completed plays from servers 12. Typically, graphical game state application 134 receives data or data produced therefrom for a recently completed play within milliseconds or seconds after the play has completed.

Figure 4:
FIG. 4 presents example real-time game data for a recent play of a live sporting event.

FIG. 4 presents example real-time game data 18 for an example professional American football play that may be received by servers 12 from data sources 22 and/or sent from servers 12 to mobile device 16. In this example, the example real-time game data 18 is in eXtensible Markup Language (XML) format. However, other data interchange formats can be used as well. The example real-time game data 18 indicates that a play occurred, provides an identifier for the play, specifies the team to which the play pertains, specifies that team in possession of the ball when the play commenced, indicates that no penalty occurred on the play, specifies that the play did not result in a score, indicates that the play was not the last play of a quarter, specifies that the play did not commence when the team in possession was goal to go with respect to the non-possessing team's end zone, indicates the time left in the current quarter when the play completed, indicates the time of day when the play completed, specifies the current quarter, specifies the current down when the play commenced, indicates the yard to go for a first down when the play commenced, and specifies the yard line the play started on. The example real-time game data 18 also includes a textual play description. Some or all of this information may be used by graphical game state application 134 for generating or updating recent play indicators 302 on a display 112 of mobile device 16.

Process for Providing Real-Time Game Data to in-Stadium Mobile Devices

Figure 5:
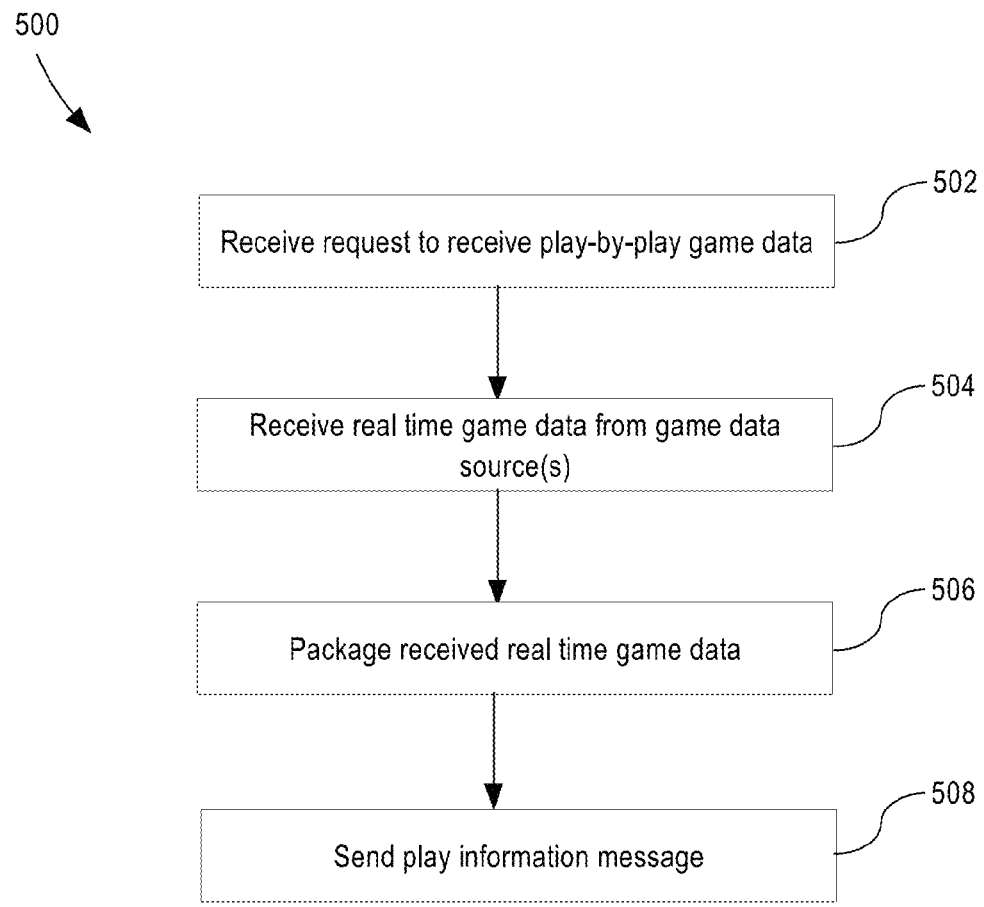
FIG. 5 is a flowchart of a computer-implemented process for providing real-time game data to in-stadium mobile devices.

FIG. 5 illustrates a process 500 for providing play-by-play game data to in-stadium spectator mobile devices according to an embodiment of the present invention. Process 500 may be performed by one or more computing devices such as servers 12. Such computing devices may be composed of general-purpose of computing components such as, for example, described below with respect to FIG. ~.

While steps of process 500 are depicted in FIG. 5 as being performed in a certain order. Some or all steps of process 500 may be performed in a different order or concurrently with one another in other embodiments.

At step 502, servers 12 receive a request from an in-stadium mobile device 16 to receive real-time game data 18 pertaining to the live sporting event being performed in the stadium. For example, servers 12 may receive the request in response to spectator 20 launching or starting the graphical game state application 134 on his or her mobile device 16 or selecting an "update now" or similar button or graphical user interface element on touch screen 112 of mobile device 16. In response to receiving the request, servers 12 store session data in computer memory for tracking mobile device 16 for purposes of sending real-time game data 18 to mobile device 16. Such session data may include a network address for mobile device 16 (for example, an Internet Protocol (IP) address).

At step 504, severs 12 receive real-time game data 18 pertaining to a recently completed play of the live sporting event from one or more game data sources 22. The real-time game data 18 may be received from a single game data source 22 or multiple game data sources 22. The real-time game data 18 can be received in a number of different data interchange formats (for example, comma separate files, XML, protocol buffers, or JSON). For example, each game data source 22 may provide real-time game data 18 in a different data interchange format. Servers 12 may receive real-time game data 18 from game data sources 22 in one or more network messages (for example, in one or more UDP or TCP/IP messages).

At step 506, servers 12 package the real-time game data 18 received from game data sources 22 into a play information message to be sent to mobile device 16. Such packaging may include combining selective information for the real-time game data 18 received from multiple game data sources 22 into the play information message. Alternatively, servers 12 may receive all real-time game data 18 included in the play information message from a single game data source 22. Play information message may be formatted according to any suitable data interchange format (for example, XML, protocol buffer, or JSON). The play information message may be formatted in the same or a different data interchange format than that of real-time game data 18 received from a game data source 22.

At step 508, the play information message is sent to mobile device 16. The play information message may be broadcast to mobile device 16 (for example, in one or more UDP network messages) or streamed to mobile device 16 (for example, in one or more TCP/IP network messages). Upon receiving the play information message, mobile device 16 uses information in the play information message to generate and/or update recent play indicators 302 on graphical representation 300 of the game state of the live sporting event displayed on display screen 112 of mobile computing device 16.

Steps 504, 506, and 508 may be performed in a loop as plays occur to provide play-by-play game data to mobile device 16 as plays of the live sporting event occur.

Interactive Drive Chart Application

In one particular embodiment, graphical game state application 134 presents an interactive drive chart to the user of mobile computing device 16. The interactive drive chart represents a "drive" in an American football contest. Generally, a drive a series of one or more consecutive plays by one of the two teams competing in the football contest. Graphical game state application 134 can generate the interactive drive chart based on real-time game data 18 and/or data produced therefrom received at mobile device 16 from servers 12.

For example, FIG. 6 illustrates an external view of mobile computing device 16 with touch-sensitive display screen 112. In this embodiment, mobile computing device 16 is executing graphical game state application 134. When executing, graphical game state application 134 presents user interface 601A on screen 112. User interface 601A includes animated drive chart 602 and scrollable drive play selector 603.

Animated drive chart 602 includes a graphical representation of a one-hundred and twenty yard football field including the two end zones with yard marking delimiters in 10 yard increments. The graphical representation presents the football field at a sufficiently small scale to fit entirely on display screen 112. A current drive of the football game is represented with drive indicator 604. Drive indicator 604 is in the form of an arrow icon and indicates where the drive started with the tail of the arrow icon, where the drive has currently advanced to with the head of the arrow icon, the amount of the football field covered by the drive with the length of the arrow, and which team possessed the football during the drive by which end zone the arrow icon points away from. In this example, drive indicator 604 indicates that a drive by the "SF" team started in between the 30 and 40 yard lines of the SF team's half of the field and progressed approximately 30 yards to in between the 30 and 40 yard line of the MIA team's half of the field.

Scrollable drive play selector 603 presents a scrollable list of plays that make up the drive represented by drive indicator 604. Details of each play are presented on a selectable play tile 605. In this example, the drive represented by drive indicator 604 comprises three plays. Three play tiles 605A, 605B, and 605C corresponding to the three plays of the drive are presented in scrollable drive play selector 603. A drive may comprise more or less plays in other embodiments. If a drive comprises a number of plays such that all play tiles 605 for the plays of the drive cannot be displayed at the same time on screen 112, then scrollable selector 603 may include a "more plays" or similar indicator to indicate to the user that scrolling the selector 603 with user input will reveal more play tiles 605 for additional plays than are currently shown on display 112.

Play tiles 605 are presented in scrollable drive play selector 603 in order of occurrence during the drive. In this example, play tiles 605A, 605B, and 605C are presented top to bottom in scrollable selector 603 in order of the corresponding plays during the drive represented by drive indicator 604. In particular, play tile 605A represents the most recent play of the plays represented by tiles 605A, 605B, and 605C, play tile 605A represents the second most recent play of the plays represented by tiles 605A, 605B, and 605C, and play tile 605C represents the least recent play of the plays represented by tiles 605A, 605B, and 605C.

In some embodiments, a portion of drive indicator 604 is visually highlighted or visually distinguished from the remainder of drive indicator 604 to indicate a portion of the drive consumed by a selected play of the drive. The play may be selected in at least two different ways. In a first way, the user directs user input to the play tile 605 corresponding to the play. For example, the user may perform a tap touch gesture in the area of touch-sensitive screen 112 where the desired play tile 605 is displayed. In a second way, the user scrolls play tiles 605 of drive play selector 603 forward or backward and plays are automatically selected as the selector 603 is scrolled. In this way, the user can easily advance and rewind through the sequence of plays of the drive by scrolling the play selector 603 up or down.

Figure 6A:
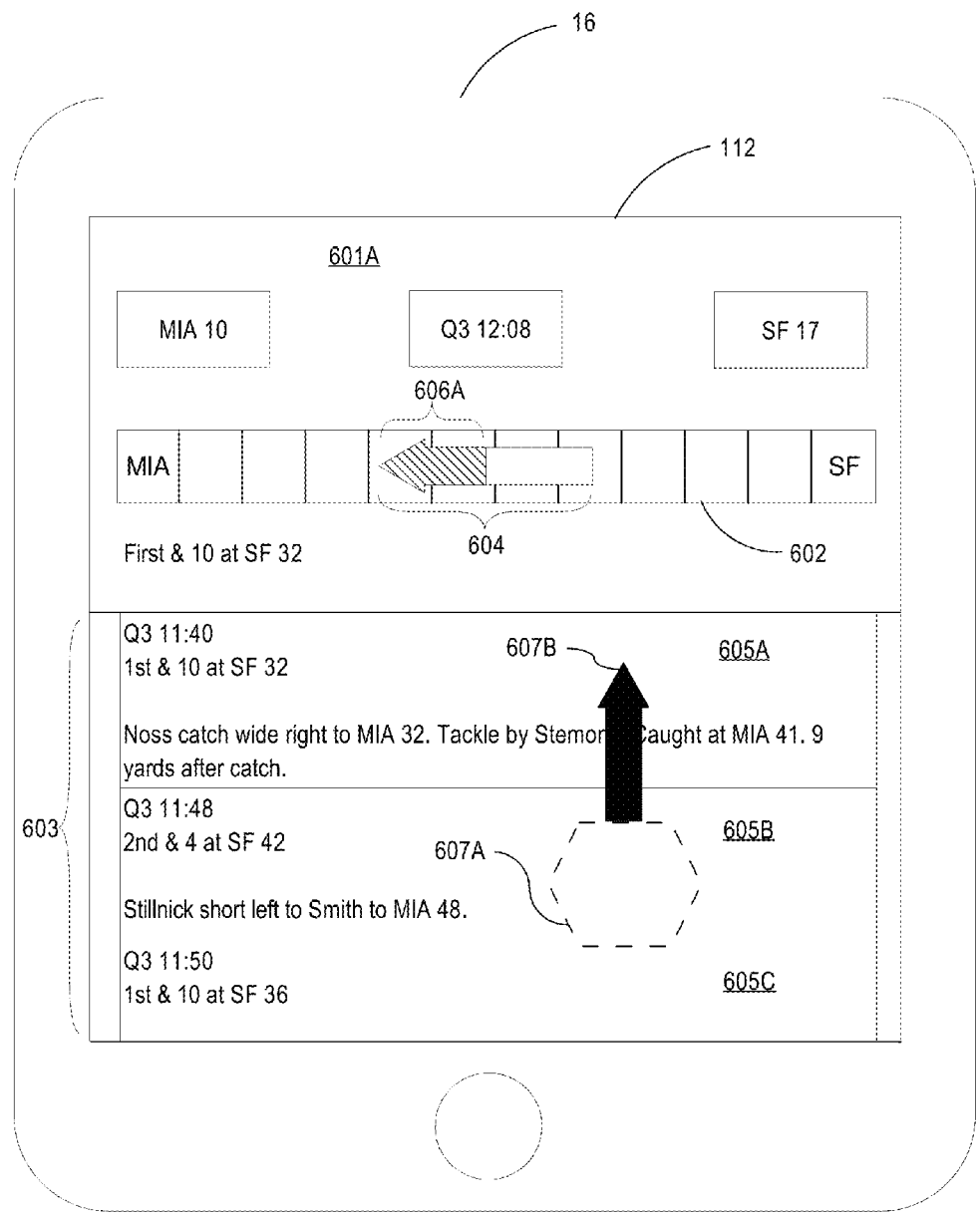
FIGS. 6A, 6B, 6C, 6D, 6E illustrate an external view of a mobile computing device with a touch screen display at various user interface states of a mobile application executing on the device.

In some embodiments, the play of the drive corresponding to the top-most play tile 605 displayed in selector 603 is selected for highlighting. In the example of user interface 601A, play tile 605A is the top-most tile in selector 603. As a result, a selected play indicator 606A of drive indicator 604 is visually highlighted in user interface 601A as indicated in FIG. 6A with diagonal cross lines in an interior portion 606A of drive indicator 604. The visual highlighting can be accomplished using a combination of a number of graphical user interface techniques such as by coloring, shading, blinking, and/or brightening the portion of the drive indicator.

The selected play indicator 606A indicates that the corresponding drive play started just inside the 50 yard line on the MIA team's half of the field and that the football was advanced with the SF team in possession of the football to just before the 30 yard line on the MIA team's half of the field. The selected play indicator 606A also indicates a percentage or portion of the total yardage gained during the entire drive by the team in possession of the football. In this example, selected play indicator 606A indicates that the corresponding play accounted for just less than half of the total yards gained by the SF team during the drive.

As shown in FIG. 6A, a swipe or flick touch gesture 607 is directed to touch screen display 112 to scroll down play selector 603. Swipe or flick touch gesture 607 starts a contact point 607A and proceeds towards contact point 607B while contact is maintained with touch screen display 112.

Figure 6B:
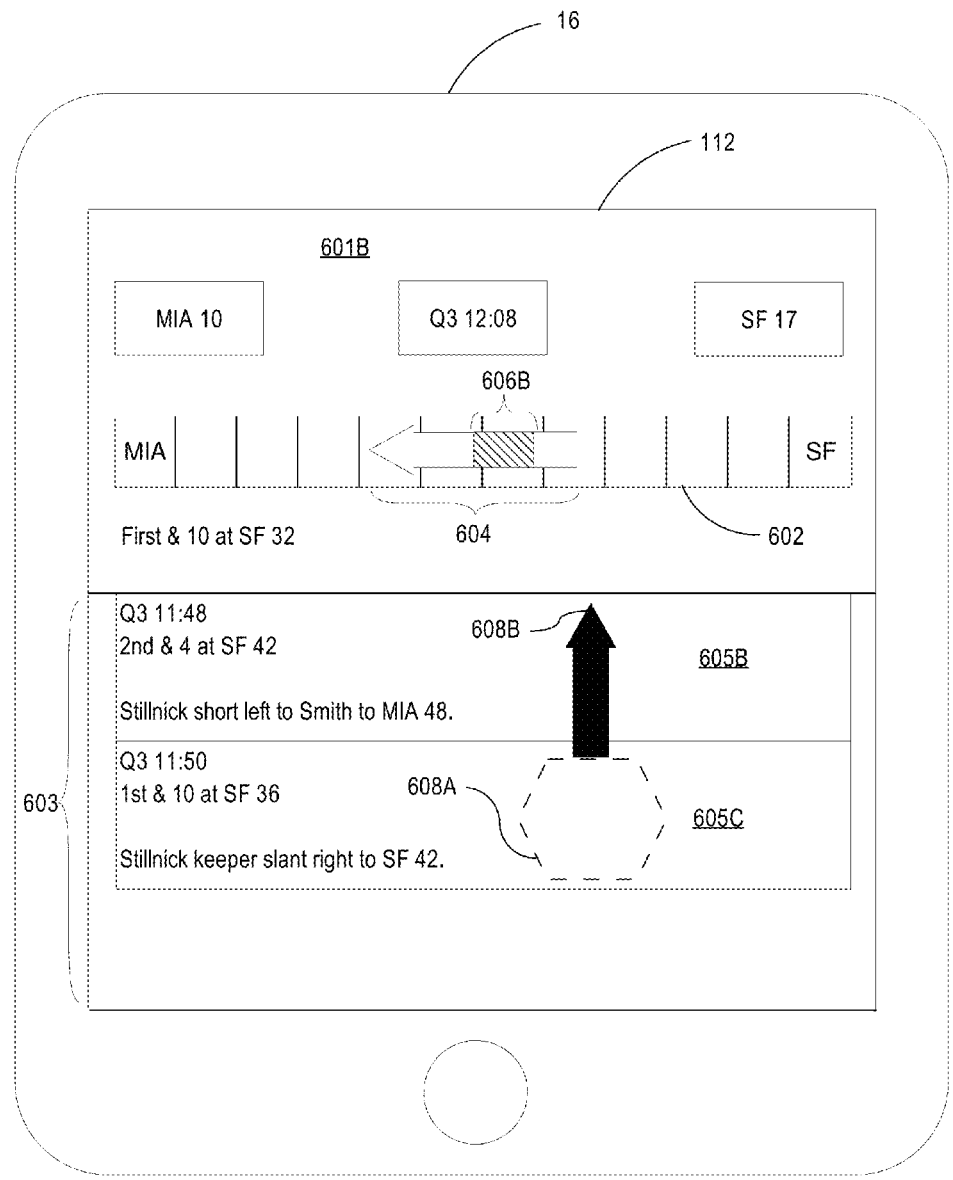

User interface 601B of FIG. 6B shows the result of swipe or flick gesture 607 of FIG. 6A. In response to gesture 607, play tile 605B has now at the top of play selector 603 as shown in FIG. 6B and the play corresponding to play tile 605B has been selected. The selected play is indicated on user interface 601B by selected play indicator 606B.

As shown in FIG. 6B, another swipe or flick touch gesture 608 is directed to touch screen display 112 to further scroll down play selector 603. Swipe or flick touch gesture 608 starts a contact point 608A and proceeds towards contact point 608B while contact is maintained with touch screen display 112.

Figure 6C:
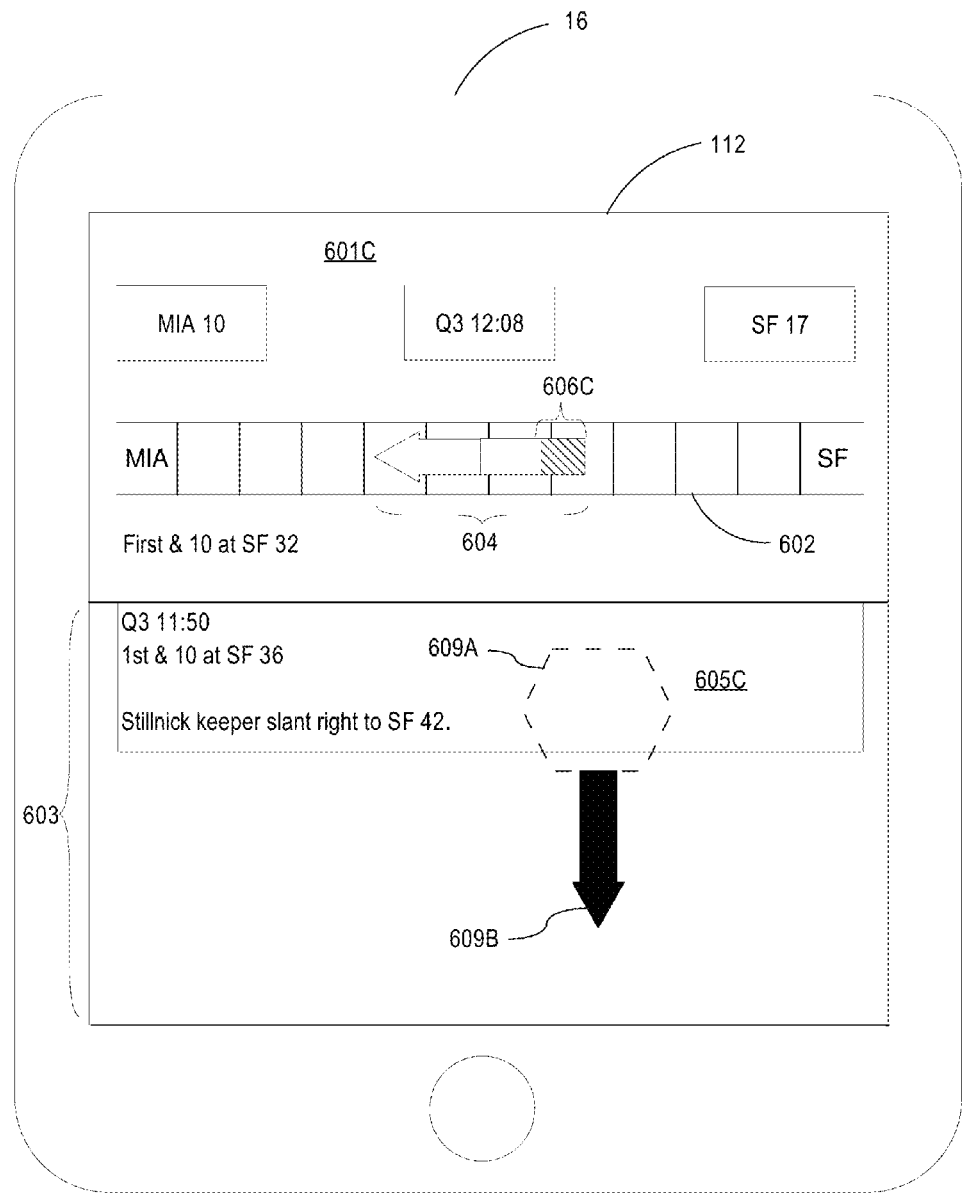

User interface 601C of FIG. 6C shows the result of swipe or flick gesture 608 of FIG. 6B. In response to gesture 608, play tile 605C is now at the top of play selector 603 as shown in FIG. 6C and the play corresponding to play tile 605C has been selected. The selected play is indicated on user interface 601C by selected play indicator 606C.

As shown in FIG. 6C, a swipe or flick touch gesture 609 is directed to touch screen display 112 to scroll up play selector 603. Swipe or flick touch gesture 609 starts a contact point 609A and proceeds towards contact point 609B while contact is maintained with touch screen display 112.

Figure 6D:
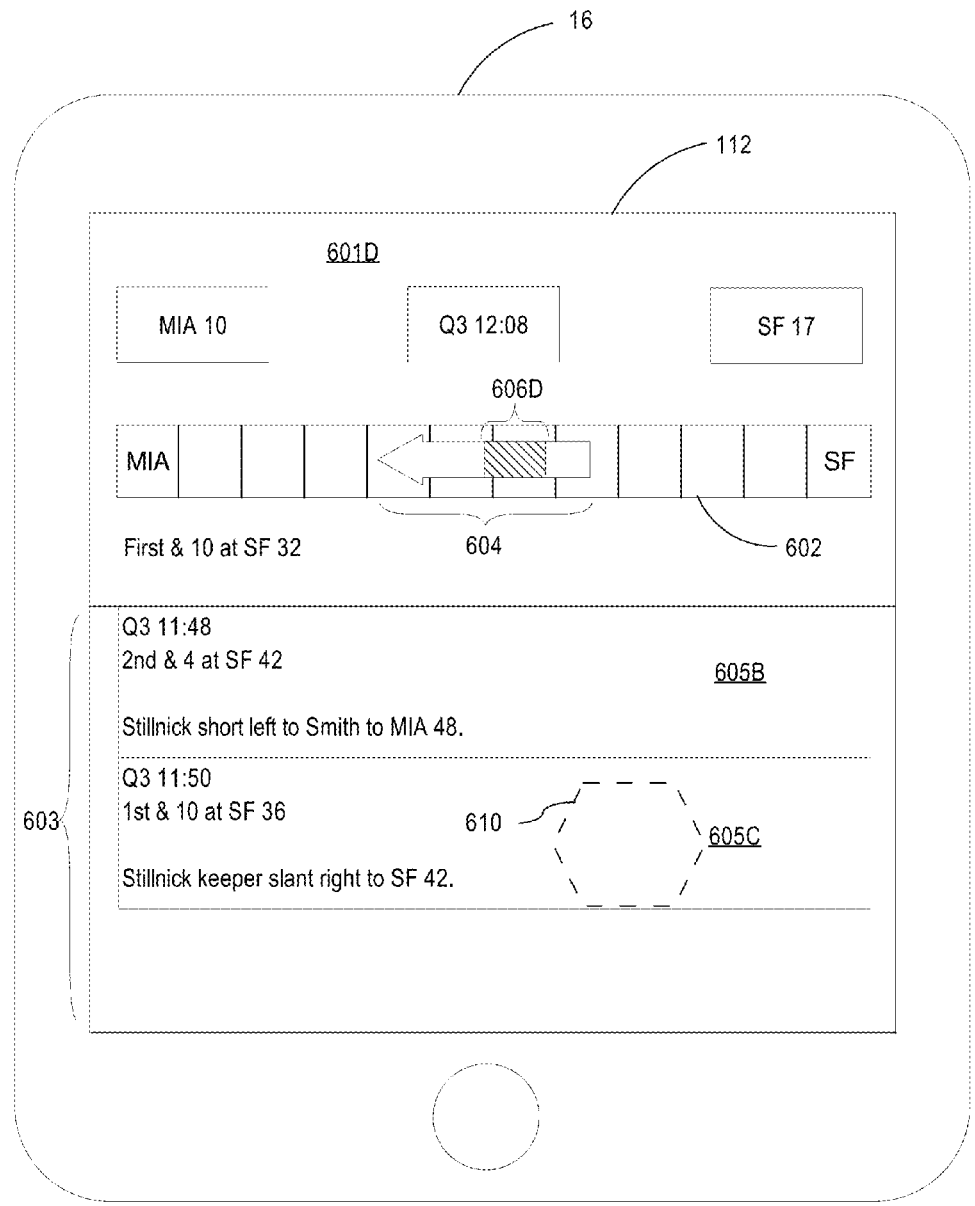

User interface 601D of FIG. 6D shows the result of swipe or flick gesture 609 of FIG. 6C. In response to scroll up gesture 609, play tile 605B is once again at the top of play selector 603 as shown in FIG. 6D and the play corresponding to play tile 605B has again been selected. The selected play is indicated on user interface 601D by selected play indicator 606D.

Figure 6E:
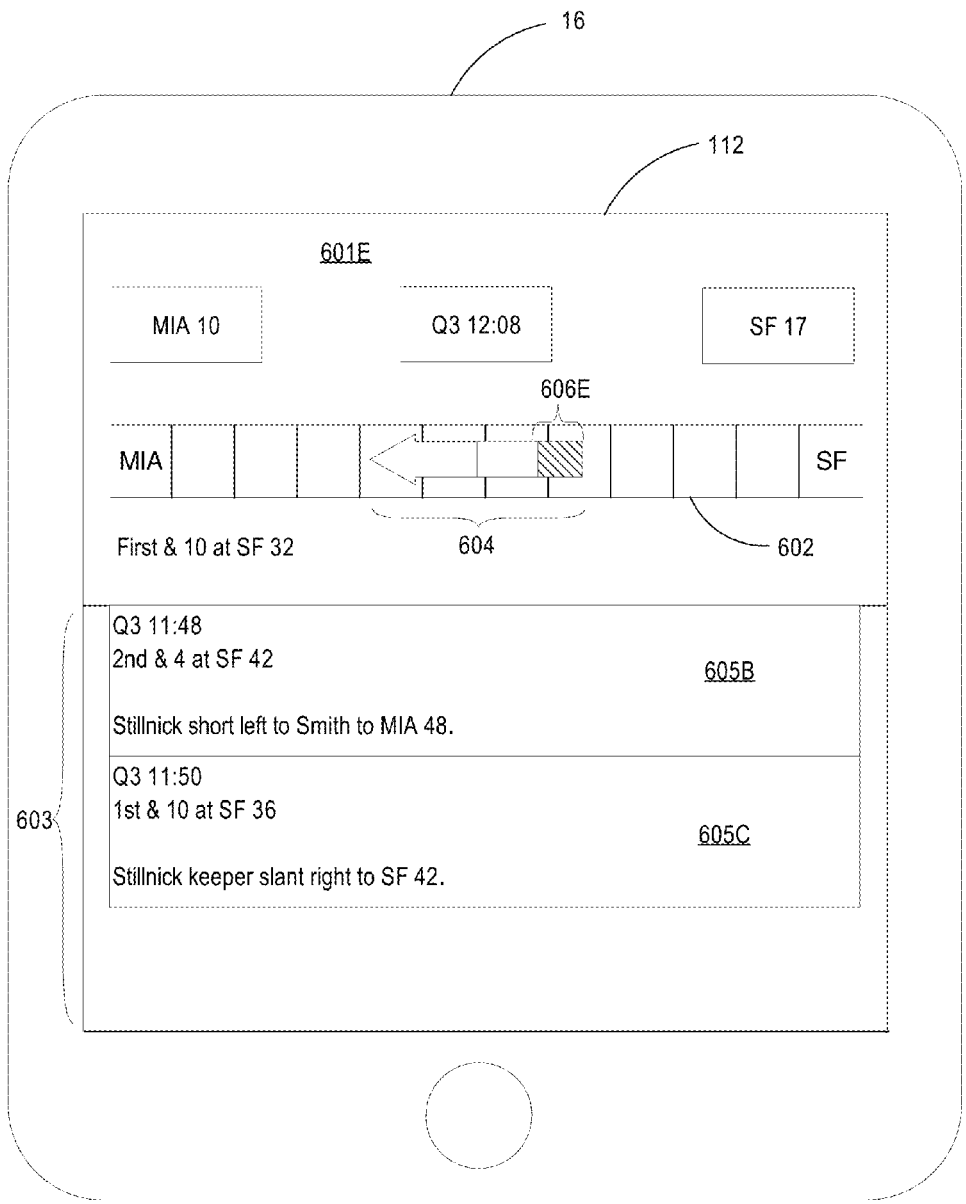

As shown in FIG. 6D, a tap or press touch gesture 610 is directed to touch screen display 112 to select play tile 605C. In response to touch gesture 610, the play corresponding to play tile 605C is selected. As shown in FIG. 6E, the selected play is indicated on user interface 601E by selected play indicator 606E.

Thus, the interactive drive chart application allows a user of the application to scroll through plays of a drive. As the user scrolls through the play tiles, the user can view details of the plays on the play tiles. For example, the user can view down and distance, field position, and player information pertaining to the plays. Also as the user scrolls through the play tiles, the drive chart is animated to visually highlight plays of the drive currently selected by the scrolling. In this way, the user can view the progression of a drive in forward or reverse play order depending on the direction of the scrolling. In addition, the user can select individual play tiles to select drive plays for highlighting on the drive chart.

Stadium Facility Load Indicators

In-stadium spectators may leave their assigned seat from time to time during a live sporting event. For example, a spectator may need to use a restroom, desire to purchase food or beverages or merchandise from a stand or shop, or want make a personal cellular phone call in a less noisy environment. Often, if a spectator leaves his or her seat to use a stadium facility such as a restroom, a concession stand, or a cell phone calling area, the spectator desires to return to the seat as quickly as possible after using the facility so as not to miss live action of the sporting event. To this end, in accordance with some embodiments, a mobile application is provided that an in-stadium spectator can run on his or her mobile computing device that allows the spectator to determine current stadium facility load. Based on the stadium facility load information provided by the mobile application, the spectator can determine superior times to leave his or her seat to use a stadium facility. For example, based on facility load information provided by the mobile application, a spectator may decide to wait in his or her seat until the load on a nearby concession stand has reduced.

Figure 7:
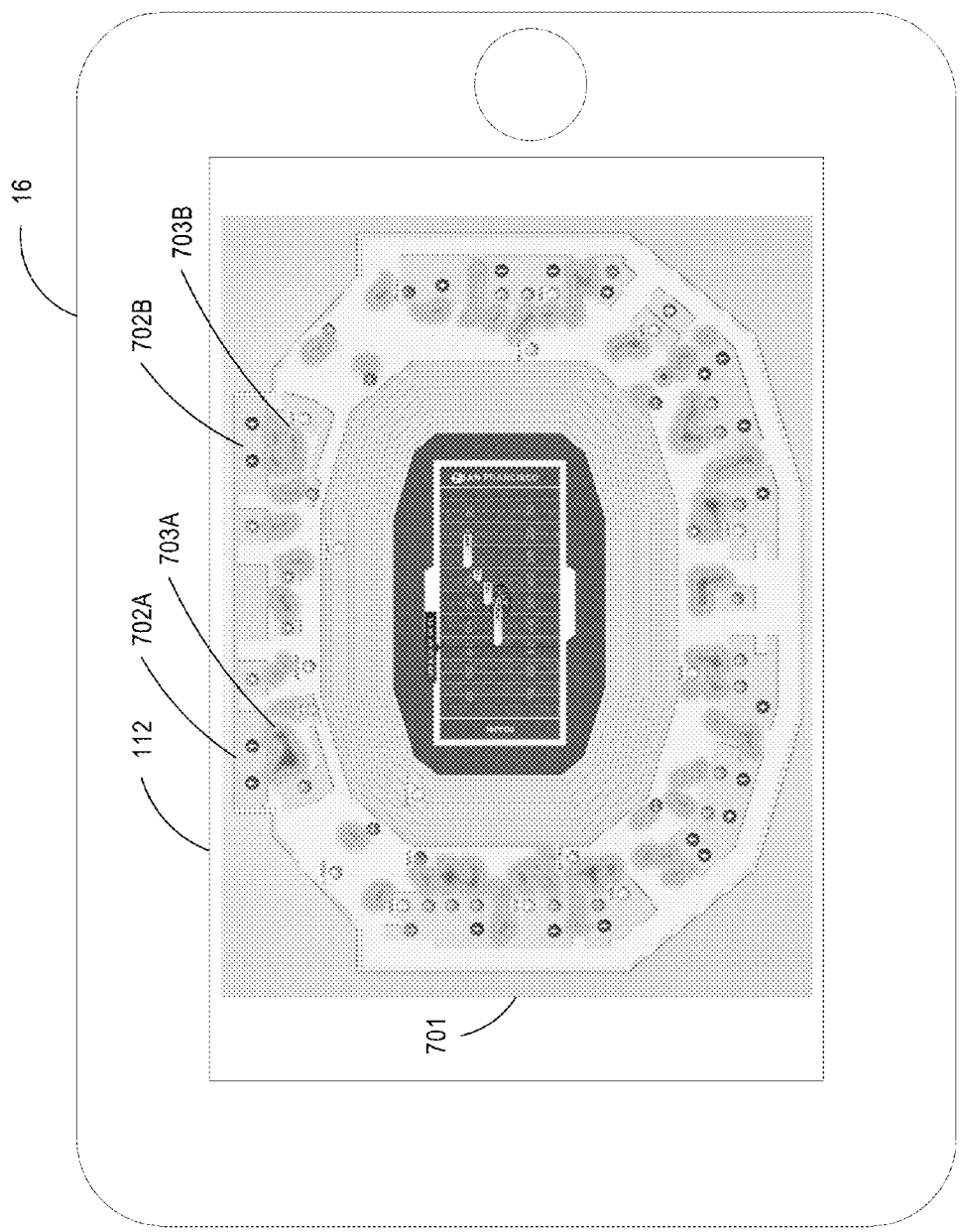
FIG. 7 illustrates an external view of a mobile computing device with a touch screen display displaying a stadium facility load map.

In accordance with some embodiments, stadium facility load is indicated by the mobile application with heat map surfaces displayed on a map of the stadium. For example, FIG. 7 illustrates an external view of mobile computing device 16 with touch screen display 112. Mobile computing device 16 is executing graphical game state application 134. As shown, when executing, graphical game state application 134 may present a map 701 of a stadium.

Map 701 indicates the location of various stadium facilities. For example, map 701 indicates the location of restroom 702A and restroom 702B in the stadium with recognizable male and female restroom icons.

Map 701 provides a number of heat map surfaces indicating facility load near stadium facilities. Each heat map surface represents a number of persons in the area of the stadium covered by the heat map surface. Conceptually cooler colors (e.g., yellow) are used in a heat map surface to indicate relatively fewer persons in the covered area and conceptually hotter colors (e.g., red) are used to indicate relatively greater number of persons in the covered area. For example, by comparing the size and coloring of heat map surface 703A compared with the size and coloring of heat map surface 703B, the spectator can discern that there are likely more persons currently using restroom facility 702A than are using restroom facility 702B.

Example Implementing Mechanism

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (for example, x) and a second axis (for example, y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:

at a mobile device with a touch screen display:

displaying a single drive indicator user interface element and a separate scrollable list of a plurality of play tile user interface elements on the touch screen display wherein the scrollable list comprises a scrollable selector that is responsive to forward or backward scroll touch gestures to scroll the scrollable list;

wherein the drive indicator visually represents a plurality of consecutive plays of one drive by a team participating in an American football contest;

wherein the drive indicator is displayed as a single graphic overlay on a graphical representation of an entire American football field;

wherein the drive indicator visually indicates an amount of the football field covered by the plurality of consecutive plays in the one drive;

wherein the drive indicator has the appearance of an arrow;

wherein the drive indicator indicates a team participating in the football contest in possession of the football for the plurality of consecutive plays;

receiving a particular forward or backward scroll touch gesture with the scrollable selector and, in response thereto, scrolling the scrollable list to display different play tile user interface elements in the scrollable list without also modifying the graphical representation of the football field;

detecting a touch gesture on the touch screen display to select a particular play tile user interface element of the plurality of play tile user interface elements;

wherein each play tile user interface element of the plurality of play tile user interface elements represents one play of the plurality of consecutive plays;

in response to detecting the touch gesture, visually highlighting a portion of the drive indicator, wherein the highlighting visually indicates an amount of the football field covered only by the play corresponding to the particular play tile user interface element and a remainder of the drive indicator is not highlighted, wherein at least the portion of the drive indicator remains visible on the display;

wherein, when the portion of the drive indicator is visually highlighted, the drive indicator concurrently visually indicates both the amount of the football field covered by only the play corresponding to the particular play tile user interface element and the amount of the football field covered by the plurality of consecutive plays.

2. The method of claim 1, wherein the touch gesture is a swipe or flick touch gesture to scroll the scrollable list.

3. The method of claim 1, wherein the touch gesture is a tap or press touch gesture to select the particular play tile user interface element.

4. The method of claim 1, wherein the particular play tile user interface element comprises information about the corresponding play.

5. The method of claim 1, further comprising:
receiving play-by-play game data pertaining to the American football contest from one or more in-stadium servers.

6. One or more non-transitory computer-readable media storing instructions which, when executed by a mobile device with a touch screen display, causes the mobile device to perform a method comprising:
displaying a single drive indicator user interface element and a separate scrollable list of a plurality of play tile user interface elements on the touch screen display wherein the scrollable list comprises a scrollable selector that is responsive to forward or backward scroll touch gestures to scroll the scrollable list;
wherein the drive indicator visually represents a plurality of consecutive plays of one drive by a team participating in an American football contest;
wherein the drive indicator is displayed as a graphic overlay on a graphical representation of an entire American football field;
wherein the drive indicator visually indicates an amount of the football field covered by the plurality of consecutive plays in the one drive;
wherein the drive indicator has the appearance of an arrow;
wherein the drive indicator indicates a team participating in the football contest in possession of the football for the plurality of consecutive plays;
receiving a particular forward or backward scroll touch gesture with the scrollable selector and, in response thereto, scrolling the scrollable list to display different play tile user interface elements in the scrollable list without also modifying the graphical representation of the football field;
detecting a touch gesture on the touch screen display to select a particular play tile user interface element of the plurality of play tile user interface elements;
wherein each play tile user interface element of the plurality of play tile user interface elements represents one play of the plurality of consecutive plays;
in response to detecting the touch gesture, visually highlighting a portion of the drive indicator, wherein the highlighting visually indicates an amount of the football field covered by only the play corresponding to the particular play tile user interface element and a remainder of the drive indicator is not highlighted, wherein at least the portion of the drive indicator remains visible on the display;
wherein, when the portion of the drive indicator is visually highlighted, the drive indicator concurrently visually indicates both the amount of the football field covered by only the play corresponding to the particular play tile user interface element and the amount of the football field covered by the plurality of consecutive plays.

7. The media of claim 6, wherein the touch gesture is a swipe or flick touch gesture to scroll the scrollable list.

8. The media of claim 6, wherein the touch gesture is a tap or press touch gesture to select the particular play tile user interface element.

9. The media of claim 6, wherein the particular play tile user interface element comprises information about the corresponding play.

10. The media of claim 6, the method further comprising:
receiving play-by-play game data pertaining to the American football contest from one or more in-stadium servers.

11. A mobile device with a touch screen display, the mobile device configured with software which, when executed by the mobile device, causes the mobile device to perform a method comprising:
displaying a single drive indicator user interface element and a separate scrollable list of a plurality of play tile user interface elements on the touch screen display wherein the scrollable list comprises a scrollable selector that is responsive to forward or backward scroll touch gestures to scroll the scrollable list;
wherein the drive indicator visually represents a plurality of consecutive plays of one drive by a team participating in an American football contest;
wherein the drive indicator is displayed as a single graphic overlay on a graphical representation of an entire American football field;
wherein the drive indicator visually indicates an amount of the football field covered by the plurality of consecutive plays in the one drive;
wherein the drive indicator has the appearance of an arrow;
wherein the drive indicator indicates a team participating in the football contest in possession of the football for the plurality of consecutive plays;
receiving a particular forward or backward scroll touch gesture with the scrollable selector and, in response thereto, scrolling the scrollable list to display different play tile user interface elements in the scrollable list without also modifying the graphical representation of the football field;
detecting a touch gesture on the touch screen display to select a particular play tile user interface element of the plurality of play tile user interface elements;
wherein each play tile user interface element of the plurality of play tile user interface elements represents one play of the plurality of consecutive plays;
in response to detecting the touch gesture, visually highlighting a portion of the drive indicator, wherein the highlighting visually indicates an amount of the football field covered only by the play corresponding to the particular play tile user interface element and a remainder of the drive indicator is not highlighted, wherein at least the portion of the drive indicator remains visible on the display;
wherein, when the portion of the drive indicator is visually highlighted, the drive indicator concurrently visually indicates both the amount of the football field covered by only the play corresponding to the particular play tile user interface element and the amount of the football field covered by the plurality of consecutive plays.

12. The device of claim 11, wherein the touch gesture is a swipe or flick touch gesture to scroll the scrollable list.

13. The device of claim 12, wherein the touch gesture is a tap or press touch gesture to select the particular play tile user interface element.

14. The device of claim 13, wherein the particular play tile user interface element comprises information about the corresponding play.

15. The device of claim 11, the method further comprising:
receiving play-by-play game data pertaining to the American football contest from one or more in-stadium servers.

* * * * *